United States Patent Office 3,399,183
Patented Aug. 27, 1968

3,399,183
OLEFIN POLYMERIZATION PROCESS AND
CATALYST THEREFOR
Donald B. Miller, Ponca City, Okla., assignor to Continental Oil Company, Ponca City, Okla., a corporation of Delaware
No Drawing. Filed Oct. 8, 1964, Ser. No. 402,609
21 Claims. (Cl. 260—93.7)

ABSTRACT OF THE DISCLOSURE

Polymerization catalyst is prepared by reacting a phosphorus-halogen compound with a first portion of an organoaluminum compound, adding a titanium halide thereto, aging the reaction product, and then adding a second portion of the organoaluminum compound thereto.

---

This invention relates to polymerization process for the preparation of polyolefins and a process for making a catalyst suitable for use in the polymerization process.

In an application Ser. No. 275,510, filed Apr. 25, 1963, and now abandoned, by G. G. McClaflin and entitled: Polymerization Catalyst, Its Preparation and Use, there is disclosed a novel catalyst comprising a phosphorus halogen compound, an aluminum compound and a titanium chloride, bromide or iodide; said aluminum compound having the formula $AlR'_yX''_{3-y}$ where $R'_y$ is saturated aliphatic or aromatic hydrocarbon, $X''$ is hydrogen or halogen, and $y$ is 2 or 3. The preferred reactants are phosphorus trichloride, triethylaluminum and titanium trichloride.

Titanium trichloride is a very expensive compound composed to titanium tetrachloride. Also the tetrachloride is easier to handle than the trichloride. However, the use of titanium tetrachloride as one of the reactants according to the teachings of Ser. No. 275,510 gave catalyst compositions having very low polymerization rates.

An object of the invention is to provide a catalyst made from a phosphorus halogen compound, aluminum compound and titanium halide, especially titanium tetrachloride, having improved olefin polymerization activity.

Another object of the invention is a polymerization process for making polyolefins.

A particular object is a process for polymerizing propene to solid polypropene of high isotoxy at a comparatively high rate.

Other objects of the invention will become apparent in the course of the detailed description of the invention.

In summary, the catalyst process of the invention involves a phosphorus halogen compound; a hydrocarbon aluminum $AlR'_yX''_{3-y}$ where $R'_y$ is a group selected from the class consisting of saturated aliphatic and aromatic, $X''$ is selected from the class consisting of hydrogen and halogen and $y$ is an integer equal to 2-3; and a titanium halide selected from the class consisting of chloride, bromide and iodide where said phosphorus halogen compound and a portion of said aluminum compound are reacted; said titanium halide is added to the reaction product at reaction conditions; the second reaction product is aged; and intermingling the remainder of said aluminum compound with the aged reaction product provides a composition having olefin polymerization catalytic properties.

In summary, the polymerization process of the invention includes the contacting of an ethylenically unsaturated hydrocarbon monomer with a catalyst, prepared by the aforesaid catalyst process, under polymerization conditions.

The catalyst is prepared by reacting in a first step a hereinafter defined aluminum compound and a phosphorus halogen compound. The compounds of more particular interest have the formula $PR_mX_n$ where R is hydrocarbon, oxygen or hydrogen; X is halogen; $m$ is an integer equal to 0(zero)–4; $n$ is an integer equal to 1–5; and $m+n$ is equal to 3–5. The preferred phosphorus compounds are the phosphorus halides, especially phosphorus trichloride and phosphorus pentachloride. The hydrocarbon groups preferably are saturated aliphatic or aromatic in nature, e.g., alkyl, aryl, alkaryl, aralkyl, cycloalkyl, alkyl-cycloalkyl and the like. There is no limitation on the number of carbon atoms which can be present in the hydrocarbon groups; however generally the compounds of lower molecular weight are preferred, for example, wherein the hydrocarbon group contains from 1 to about 12 carbon atoms.

The phosphorus compounds also include the oxy halides and the hydrocarbon oxy halides, the phosphines, phosphonium compounds such as the tetraalkyl phosphonium halides and any other of the various phosphorus halogen compounds.

A wide variety of aluminum compounds can be employed as represented by the formula $AlR'_yX''_{3-y}$ wherein $R'_y$ is saturated aliphatic or aromatic, $X''$ is selected from hydrogen and halogen and $y$ is equal to 2 or 3. The aluminum compounds include the alkyl and aryl halides and hydrides as well as the trihydrocarbon substituted aluminum compounds. The hydrocarbon radicals in the aluminum compounds can be either like or unlike and include the saturated aliphatic and aromatic groups, such as, alkyl, aryl, cycloalkyl alkaryl and aralkyl. The hydrocarbon groups preferably contain from 1 to about 12 carbon atoms and more preferably the lower alkyl groups contain from 2 to about 8 carbon atoms. The aluminum compounds are preferably the trialkylaluminums, such as, for example, triethylaluminum, tripropylaluminum, triisobutylaluminum and the like.

The third reagent for the catalyst system of this invention is a titanium compound which is identified by the formula $TiX'_z$ wherein $X'$ is selected from chlorine, bromine and iodine and $z$ is equal to 2–4. The preferred titanium compounds are titanium chlorides, particularly titanium tetrachloride.

A wide variety of combinations of the various catalyst reactants are possible and space permits listing only of a minor proportion of the total number of reagent combinations for catalyst manufacture. The following examples are presented merely as specific exemplifications of catalyst preparation systems which are effective: Triethylaluminum, titanium tetrachloride and isobutyl phosphorus tetrachloride; diethylaluminum hydride, titanium dichloride and benzylphosphorus dichloride; dipropylaluminum chloride, titanium tetrachloride and dichlorophosphine; triisobutylaluminum, titanium tetrabromide and ethyl phosphorus dibromide; diphenylaluminum hydride, titanium triiodide and phosphorus pentaiodide; triisopropylaluminum, titanium tetrachloride and phosphorus trichloride; dihexylaluminum hydride, titanium tetrachloride and isobutyl phosphorus tetrachloride; triethylaluminum, titanium tribromide and phosphorus oxytribromide; diethylaluminum hydride, titanium tribromide and phenyl phosphorus tetrabromide; dipropylaluminum chloride, titanium tetrabromide and phosphorus tribromide; dinonylaluminum iodide, titanium trichloride and dodecyl phosphorus dichloride; didodecylaluminum bromide; titanium tribromide and tetrabutylphosphonium iodide; triethylaluminum, titanium tetrachloride and phosphorus trichloride; tricyclohexylaluminum, titanium tetrabromide and ethyl phosphorus dibromide; tribenzylaluminum, titanium tetraiodide and benzyl phosphorus dichloride; tri(methylcyclopentyl)aluminum, titanium diiodide and phosphorus oxytribromide; trieicosylaluminum, titanium tetrachloride and dodecylphosphorus dichloride; dicyclobutylaluminum hydride, titanium tribromide and (methylbenzyl) phosphorus tetrachloride; triphenylaluminum, titanium tetrachloride and phosphorus trichloride; tricyclobutylaluminum, titanium tetrabromide and isobutyl phosphorus tetrachloride; diisobutylaluminum hydride, titanium dichloride and phosphorus tribromide; diphenylaluminum chloride, titanium trichloride and tetrabutylphosphonium iodide; triethylaluminum, titanium tetraiodide and dichlorophosphine; triisopropylaluminum, titanium dibromide and dichlorophosphine; triisopropylaluminum, titanium dibromide and phosphorus pentaiodide; didodecylaluminum bromide, titanium tetrachloride and phosphorus trichloride; dipropylaluminum chloride, titanium trichloride and phosphorus oxytribromide; diethylaluminum hydride, titanium diiodide and benzyl phosphorus dichloride; tridecylaluminum, titanium tetrachloride and phenyl phosphorus tetrabromide; triisobutylaluminum, titanium tetrachloride and phosphorus trichloride; dihexylaluminum hydride, titanium dibromide and tetrabutylphosphonium iodide; diphenylaluminum hydride, titanium tribromide and phosphorus oxytrichloride; dinonylaluminum iodide, titanium tetrachloride and ethyl phosphorus dibromide; trioctadecylaluminum, titanium tetrachloride and phenyl phosphorus tetrabromide; trieicosylaluminum, titanium tetrabromide and isobutyl phosphorus tetrachloride; and tricyclohexylaluminum, titanium tribromide and cyclohexylphosphorus tetrachloride.

The preferred catalyst systems are those including phosphorus trichloride in combination with trialkylaluminum and titanium tetrachloride.

The catalyst of this invention is prepared by a process which includes an ageing step. In the process all of the phosphorus halogen reactant and a portion of the aluminum compound reactant are intermingled, in a first step, and permitted to react. With the preferred reactants the reaction takes place readily at ordinary ambient temperatures, e.g., 15°–35° C.; reaction is evidenced by the formation of a milky suspension.

All of the defined titanium halide reactant is then added to the reaction product of the first step. With the preferred reactants, reaction in this second step is evidenced by the formation of a red-brown precipitate; this second step reaction also takes place readily at ordinary ambient temperatures.

The second step reaction product is then allowed to stand, age, for a time at least long enough to reach a condition that the final catalyst composition shows a substantial increase in olefin polymerization activity relative to a composition that has not been aged after step two. The ageing time is dependent on the reactants and also on the temperature of ageing. With the preferred reactants at a temperature of about 20–30° C. ageing is continued for at least about 6 hours and preferably for about 18–24 hours.

After the reaction product of step two has been aged, the solvent and other liquids may be separated from the solid material and the activator added to the solid material. More usually, the activator will be added to the entire reaction product mixture. The activator may be the same aluminum compound as was used in step two or may be a different member of the defined class of aluminum compounds. Enough aluminum compound is added and intermingled with the aged reaction product to produce a composition having at least olefin polymerization activity. The amount of activator added is dependent on the aged reaction product and the activator compound itself—not all of the defined aluminum compounds are of equal effectiveness.

The catalyst composition of the invention, i.e., the result of the intermingling of the aged reaction product and the activator, is an effective catalyst for olefin polymerization having comparatively rapid rates.

As has been stated before, the preferred classes of catalyst reactants are the phosphorus chlorides, the trialkylaluminums having 1–12 carbon atoms in each alkyl group, and the titanium chlorides. The preferred phosphorus chloride is phosphorus trichloride and the preferred titanium chloride is titanium tetrachloride. Desirably triethylaluminum is used.

When using the preferred members of the defined catalyst reagents, the amount of phosphorus trichloride and aluminum compound charged to the first step is on the order of about 0.3:1—moles of phosphorus to moles of aluminum—to about 1:1. The amount of titanium tetrachloride charged to the second step is related to the amount of aluminum charged to the first step; generally the molar proportion of aluminum charged to the the first step to the amount of titanium charged to the second step is at least about 1:1; usually this relation is in the region of about 1:1 to about 1.7:1. With the preferred members, the amount of activator charged has been related to the titanium charged; generally the molar proportion of aluminum charged as activator to the titanium charged in the second stop is at least about 1:1. Usually more than this amount of activator is charged, e.g., from about 4:1 to about 16:1.

The monomers which can be polymerized through the use of the catalysts of this invention are polymerizable, ethylenically unsaturated hydrocarbon monomers. The preferred class of these hydrocarbons is the 1-olefins, such as, for example, ethylene, propylene, 1-butene, 1-hexene, 1-octene, 2-methylbutene-1, 4-methylpentene-1 and the like. Of particular interest in copolymerization are the internal olefins, and cyclic olefins. These ethylenically unsaturated monomers also include the aryl olefins, for example, styrene and the alkyl substituted styrenes. Olefins in which double bonds are either the conjugated or non-conjugated positions can also be employed. These include, for example, 1,5-hexadiene, 1,4-pentadiene, 1,4,7-octatriene, isoprene, 2-phenylbutadiene and the like. Mixtures of these monomers may be charged to the polymerization process.

The polymerization reaction is preferably carried out in the presence of an inert hydrocarbon diluent which may be paraffin, cycloparaffin or aromatic, e.g., pentane, hexane, heptane, isooctane, cyclohexane, methylcyclopentane, benzene, toluene and the like.

The polymerization reaction is carried out at a temperature usually between about 0° and 150° C., with the temperature varying depending on the particular monomer being polymerized and also with the particular catalyst system. Commonly, the temperature is maintained within the range of about 25° to about 100° C. The reaction pressure is that pressure which is required to maintain the diluent in the liquid state under the prevailing reaction conditions. The pressure can vary widely but usually is between atmospheric and about 200 p.s.i.g. The time required to carry out the polymerization reaction is dependent on a number of variables including the particular monomer employed, the catalyst system, the relative proportion of the monomer and the catalyst, the reaction temperature, etc. Broadly, the reaction time can vary from about as low as a few minutes, for example, 2 minutes, to as high as 100 hours. Generally, however, in a batch process, the reaction is carried out over a period from about 3 to 24 hours.

As is well known, certain materials which tend to inactivate aluminum alkyl catalysts must be avoided in carrying out the preparation of the catalysts and in the polymerization reactions. These materials include oxygen and water, therefore, the diluents which are employed in carrying out the polymerization process should be substantially free from these materials.

The polymerization process can be operated as either a batch process or a continuous process.

Recovery of the polymer from the polymerization reaction product is effected in accordance with conventional procedures.

ILLUSTRATIONS

The process of the invention is illustrated by several examples; comparative data and statements of fact are also presented. In these illustrations the catalyst reagents are: triethylaluminum ($Et_3Al$); phosphorus trichloride ($PCl_3$); and titanium tetrachloride ($TiCl_4$). The quantities of catalyst reagents are expressed in millimoles (mmoles). The polymerization process is illustrated with propene. In this work four procedures were used to prepare catalyst compositions. Procedures I and II below illustrate two catalyst compositions of the inventor. Procedure IV is that used in prior art Ser. No. 257,510.

In procedure I $Et_3Al$ and $PCl_3$ are mixed in heptane in the absence of air and moisture and allowed to react and age for a short time. Then $TiCl_4$ is added and the mixture allowed to react at room temperature for several hours, or a day or longer. The clear colorless liquid is now decanted from the red-brown precipitate, and the precipitate is washed with an inert liquid such as heptane. Finally fresh heptane is added to provide a polymerization medium. (Decanting and washing are performed in the absence of air and moisture.) Then to activate the catalyst is added an alkylaluminum such as $Et_3Al$.

Procedure II is much like procedure I except that the decanting and washing steps are omitted. Instead, the alkylaluminum activator is added to the original mixture after it has aged.

In procedure III which is shown for comparison, the total quantities of each catalyst component are the same as in procedure II. But in procedure III, all the alkylaluminum is added at one time, during the initial mixing of the catalyst components, instead of adding part of the alkylaluminum in the initial mixing and part later as an activator.

In procedure IV, all the $Et_3Al$ and $PCl_3$ is added and permitted to react for 0.5 hour, then the $TiCl_4$ is added—a brown suspension is formed. This brown suspension is used more or less immediately as a catalyst. (Procedure IV differs from procedure III in that a lower ratio of $Et_3Al$ to $PCl_3$ was used.)

After the preparation of the polymerization catalyst by one of the preceding methods, the polymerizations are performed in an agitated system at 75° with 40 p.s.i. propene pressure. The polymerizations are continued for 3½ to 5 hours. Then the polymerization vessels are vented. The catalyst is deactivated by the addition of isopropanol containing some hydrogen peroxide. The polymerization mixtures are mixed with vigor in a blender and then washed with dilute hydrochloric acid and water. The organic layer containing the suspended polymer is diluted to about twice its volume with isopropanol and then filtered to separate the insoluble polymer. This polymer is then washed with isopropanol and dried in vacuo. The polymerization rate was calculated on the basis of g. polymer/g. $TiCl_4$/3.5 hours. The polymer isotaxy was taken as the percent of polymers not extractable by refluxing heptane.

Run 1

Catalyst was prepared according to procedure IV using 6.60 mmoles of $Et_3Al$, 2.90 mmoles of $PCl_3$ and 4.55 mmoles of $TiCl_4$. The Al/Ti molar ratio is 1.45 and the P/Al molar ratio is 0.44. The polymerization rate was 8.2 and isotaxy was 97%.

Example 2

Catalyst was prepared according to procedure II using 3.44 mmoles of $Et_3Al$ and 1.52 mmoles of $PCl_3$ in the initial reaction—a P/Al molar ratio of 0.44. 2.37 mmoles of $TiCl_4$ was added after 0.5 hour—an Al/Ti molar ratio of 1.45. Then the brown suspension was aged for several hours and 4.38 mmoles of $Et_3Al$ added as activator. The polymerization rate was 18.0 and the isotaxy was 93%.

Examples 3+

Several tests with catalyst made according to procedure I established that catalyst made by procedures I and II were essentially equal in effectiveness.

Runs 4+

Several tests with catalyst made according to procedure III established that this composition is only weakly catalytic with respect to polymerization rate—rates on the order of 0.2–0.8.

Examples 5–8

Effect of catalyst aging.—Procedure II was used. Heptane (500 ml.) that had been acid washed and distilled over $CaH_2$ was transferred to an argon filled one-quart beverage bottle which was capped with a solvent resistant septum. Then 2.3 mmoles $Et_3Al$ and 2.37 mmoles $PCl_3$ were added to the bottle to give a milky suspension. After about 0.5 hour, 2.37 mmoles $TiCl_4$ was added to the mixture giving a yellow brown suspension which gradually darkened and deposited a reddish brown gum. This catalyst mixture was allowed to age for different time intervals. Then 14.6 mmoles additional $Et_3Al$ was added to activate the catalyst. The propene polymerization was then conducted at 70–75° with agitation for 3.5 hours. The polypropene was isolated as described above. The results are shown below:

|  | 8 | 7 | 6 | 5 |
|---|---|---|---|---|
| Aging time (hrs.) | 24 | 7.5 | 4.6 | 1.4 |
| Relative rates | 71 | 43 | 17 | 15 |
| Total isotaxy | 90 | 88 | 84 | 82 |
| Inh. visc | 5.0 | 6.2 | 4.5 | 4.8 |

These data include all polymer which was formed. The corresponding data of Ex. 1–2, however, include only the insoluble polymer isolated in the standard isolation procedure. Therefore, the relative rates are slightly smaller and the isotaxies are slightly greater than if they had been calculated as in Ex. 5–8. The Examples 5–8 differ from the technique of Examples 1–4 in that the heptane had been acid treated.

Example 9

Polymerization of 4-methyl-1-pentene.—Into a septum-capped 200 ml. beverage bottle containing 20 ml. heptane were added 2.25 mmoles $Et_3Al$, 1.0 mmole $PCl_3$, and, after 0.5 hour, 1.5 mmoles $TiCl_4$. After one day, 3.3 mmoles additional $Et_3Al$ was added to activate the catalyst. 10 ml. 4-methyl-1-pentene was then added and the mixture agitated at 75° for 3 hrs. Since considerable polymer was now present, 10 ml. additional 4-methyl-1-pentene was charged to the bottle, and polymerization was continued for an additional 21 hours. After the usual isolation procedure, 7.6 g. total polymer was obtained. 79% of the polymer was not soluble in refluxing heptane; the inherent viscosity (0.1 g./100 ml. Decalin at 135°) was 5.6. (An attempt to conduct a polymerization of 4-methyl-1-pentene without the catalyst activation step was unsuccessful.)

Example 10

Polymerization using TIBAL.—Into a septum-capped 200 ml. bottle containing 100 ml. dry heptane was added 1.5 mmoles triisobutylaluminum (TIBAL), 1.5 mmoles $PCl_3$, and after 0.5 hour, 1.5 mmoles $TiCl_4$. After one day, 11.7 mmoles additional TIBAL was added to activate the catalyst. After 7 g. propene had been charged to the bottle, it was agitated at 75° for 18 hours. In the usual way there was isolated 2.2 g. polymer which was 64% insoluble in refluxing heptane and which had an inherent viscosity of 5.3. (An attempted polymerization which omitted the catalyst activation step was unsuccessful.)

Hydrogen peroxide treating

It has been discovered that an improved polymer is obtained when hydrogen peroxide is present with the alcohol catalyst deactivating agent used to destroy the polymerization catalyst. Tests with and without hydrogen peroxide have esablished that the hydrogen peroxide addition with the alcohol destroys phosphines and similar compounds which are present in the polymerization catalyst. Additionally the hydrogen peroxide eliminates the dark color in titanium compounds which frequently form in polymerization catalysts of this type.

Using hydrogen peroxide in conjunction with the alcohol deactivating agent is more effective in eliminating phosphines and color bodies from the catalyst than is an after treatment with hydrogen peroxide after the catalyst has been deactivated with alcohol. (In the absence of hydrogen peroxide.)

I claim:

1. In the process of making a catalyst composition wherein a phosphorus halogen compound of the formula $PR_mX_n$ where R is hydrocarbon, oxygen or hydrogen, X is halogen, $m$ is 0–4, $n$ is 1–5, and $m+n$ equals 3 or 5; a hydrocarbon aluminum compound $AlR'_yX''_{3-y}$ where $R'_y$ is a group selected from the class consisting of saturated aliphatic and aromatic, $X''$ is selected from the class consisting of hydrogen and halogen and $y$ is an integer equal to 2–3; and a titanium halide of the formula $TiX_n$ where $n$ is 3 or 4 and X is selected from the class consisting of chloride, bromide and iodide are intermingled to form a reaction product having olefin polymerization catalytic properties, the improvement comprising:
   (a) reacting said phosphorus halogen compound and a portion of said aluminum compound;
   (b) adding said titanium halide to the reaction product of (a) at reaction conditions;
   (c) aging the reaction product of (b); and
   (d) intermingling the remainder of said aluminum compound with the aged reaction product (c).

2. A process in accordance with claim 1 wherein said aging is continued at least until said catalyst composition has developed a substantial increase in polymerization activity.

3. A process in accordance with claim 1 wherein said phosphorus halogen compound is phosphorus chloride, said aluminum compound is trialkyl aluminum having 1–12 carbon atoms in each alkyl group, and said titanium halide is titanium chloride.

4. A process in accordance with claim 3 wherein said phosphorus chloride is phosphorus trichloride and said titanium chloride is titanium tetrachloride.

5. A process in accordance with claim 4 wherein the molar proportion of phosphorus to aluminum charged to said step (a) is from about 0.3:1 to about 1:1.

6. A process in accordance with claim 4 wherein the molar proportion of aluminum charged to said step (a) to said titanium is at least about 1:1.

7. A process in accordance with claim 6 wherein the molar proportion of aluminum charged to said step (d) to said titanium is at least about 1:1.

8. A process in accordance with claim 7 wherein said aging is continued for at least about 6 hours at a temperature of about 20°–30° C.

9. A process in accordance with claim 8 wherein said aging time is about 18–24 hours.

10. A process of making a polymerization catalyst composition which process comprises:
    (a) reacting phosphorus trichloride and triethylaluminum in a molar ratio of about 1:1, at a temperature of about 25° C.;
    (b) reacting titanium tetrachloride with the reaction product of (a) in a molar ratio of aforesaid triethylaluminum to titanium tetrachloride of about 1:1, at a temperature of about 25° C.;
    (c) aging the reaction product of (b) for a time of about 18–24 hours at a temperature of about 25° C.; and
    (d) intermingling with the aged product additional triethylaluminum in a molar ratio of additional triethylaluminum to said titanium tetrachloride of about 6:1.

11. In the process of polymerizing an ethylenically unsaturated hydrocarbon monomer in the presence of a catalyst formed by reacting a phosphorus halogen compound of the formula $PR_mX_n$ where R is hydrocarbon, oxygen or hydrogen, X is halogen, $m$ is 0–4, $n$ is 1–5, and $m+n$ equals 3 or 5; a hydrocarbon aluminum compound $AlR'_yX''_{3-y}$ where $R'_y$ is a group selected from the class consisting of saturated aliphatic and aromatic, $X''$ is selected from the class consisting of hydrogen and halogen and $y$ is an integer equal to 2–3; and titanium halide of the formula $TiX_n$ where $n$ is 3 or 4 and X is selected from the class consisting of chloride, bromide and iodide, the improvement comprising:
   using as the catalyst a composition prepared by (1) reacting said phosphorus halogen compound and a portion of said aluminum compound; (2) adding said titanium halide to the reaction product of (1) at reaction conditions; (3) aging the reaction product of (2); and (4) intermingling the remainder of said aluminum compound with the aged reaction product (3).

12. A process in accordance with claim 11 wherein said monomer is propylene.

13. A process in accordance with claim 11 wherein said phosphorus halogen compound is phosphorus chloride, said aluminum compound is trialkyl aluminum having 1–12 carbon atoms in each alkyl group, and said titanium halide is titanium chloride.

14. A process in accordance with claim 13 wherein said phosphorus chloride is phosphorus trichloride and said titanium chloride is titanium tetrachloride.

15. A process in accordance with claim 14 wherein the molar proportion of phosphorus to aluminum charged to said step (1) is from about 0.3:1 to about 1:1.

16. A process in accordance with claim 14 wherein the molar proportion of aluminum charged to said step (1) to said titanium is at least about 1:1.

17. A process in accordance with claim 16 wherein the molar proportion of aluminum charged to said step (4) to said titanium is at least about 1:1.

18. A process in accordance with claim 17 wherein said aging is continued for at least about 6 hours at a temperature of about 20°–30° C.

19. A process in accordance with claim 18 wherein said aging time is about 18–24 hours.

20. A process of polymerizing propylene which process comprises: contacting propylene at about 75° C. with a catalytic amount of a composition prepared by
    (1) reacting phosphorus trichloride and triethylaluminum in a molar ratio of about 1:1, at a temperature of about 25° C.;
    (2) reacting titanium tetrachloride with the reaction product of (1) in a molar ratio of aforesaid triethylaluminum to titanium tetrachloride of about 1:1, at a temperature of about 25° C.;
    (3) aging the reaction product of (2) for a time of about 18–24 hours at a temperature of about 25° C.; and
    (4) intermingling with the aged product additional triethylaluminum in a molar ratio of additional triethylaluminum to said titanium tetrachloride of about 6:1.

21. A process in accordance with claim 20 wherein said catalyst is deactivated with a solution of isopropanol and hydrogen peroxide.

References Cited

UNITED STATES PATENTS

| | | | |
|---|---|---|---|
| 2,951,045 | 8/1960 | Gamble | 260—94.9 |
| 3,058,963 | 10/1962 | Vandenberg | 260—94.9 |

FOREIGN PATENTS

| | | |
|---|---|---|
| 3,615,287 | 8/1961 | Japan. |

JOSEPH L. SCHOFER, *Primary Examiner.*

M. B. KURTZMAN, *Assistant Examiner.*